Nov. 3, 1936.  H. F. PARKER  2,059,270

BRAKE

Filed March 20, 1933

INVENTOR
Humphrey F. Parker
BY
ATTORNEY

Patented Nov. 3, 1936

2,059,270

UNITED STATES PATENT OFFICE 2,059,270

BRAKE

Humphrey F. Parker, New York, N. Y.

Application March 20, 1933, Serial No. 661,769

6 Claims. (Cl. 188—79.5)

This invention relates to brakes and more particularly to brakes of the internal expanding type for use on automotive vehicles.

An object of the invention is to provide a simple brake having very stable characteristics despite such factors as changes in the condition of the brake lining, moisture, overheated drums, etc.

Another object of the invention is to provide a brake suitable for operation in conjunction with auxiliary power externally applied, for example by air pressure, vacuum booster, or servo power mechanisms. In this case the utmost smoothness of operation is desirable while the effectiveness factor, or ratio of internal braking effect to power input, may be sacrificed to some extent.

A further object of the invention is to provide a simple method for adjusting a pair of brake shoes actuated by a floating cam.

Further objects and advantages of the invention reside in the various combinations hereafter described and claimed, as will be apparent upon reference to the accompanying drawing, in which:

Figure 1:
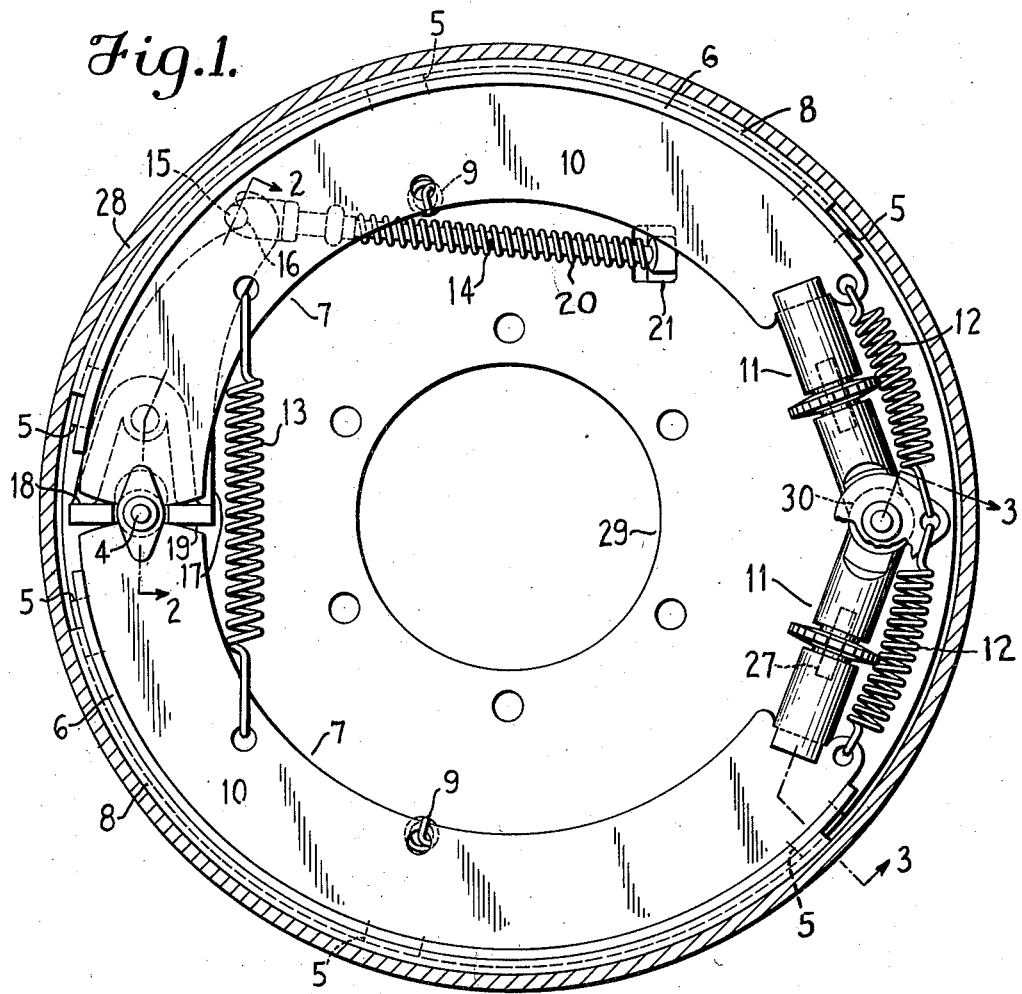
Figure 1 is a side elevation of a brake embodying the invention.
Figure 2:
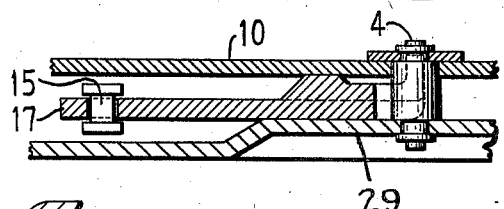
Figure 2 is a section substantially on the line 2—2 of Figure 1.
Figure 3:
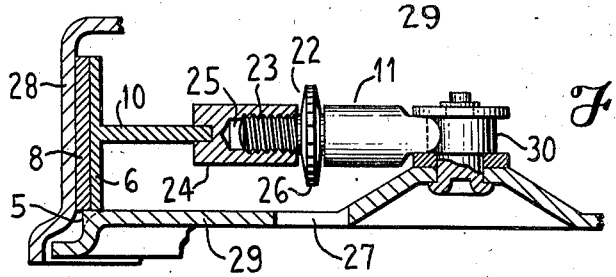
Figure 3 is a section substantially on the line 3—3 of Figure 1.

In the embodiment of the invention illustrated there is provided a conventional drum 28 at the open side of which is a fixed support such as the backing plate 29. Positioned on the backing plate are the anchor pin 30, the guide post 4, and the steady rest ledges 5. Upon these ledges rest the rims 6 of the shoes 7; the rims are surfaced with the friction elements or brake linings 8, and the shoes are held against the steady rest ledges by the springs 9 attached to the webs 10 of the shoes 7 and to the backing plate 29.

When the linings 8 of the shoes 7 are brought into contact with the rotatable drum 28, forces are brought into play tending to cause the shoes to rotate; these forces are resisted by the pressure of the shoes upon the anchor. Instead however of attaching the shoes directly to the anchor, the braking load is transmitted from shoe to anchor thru the medium of the link or strut 11. By interposing this member between shoe and anchor the shoe is enabled to adapt itself to the contour of the drum, and excessive loads that might otherwise build up due to wedging action between the toe of the shoe and the drum are obviated. The spring 12, attached to the heel of the shoe and to the anchor, serves to hold the assembly together. The retracting spring 13, in addition to withdrawing the friction surfaces from contact with the drum when the brake is not in operation, holds the assembly together at the toe ends of the shoes.

The brake is actuated by the cable 14. This cable normally enters the brake horizontally thru the hole 21 in the backing plate 29, passing over the top of the axis of the brake. The brake normally is arranged with the anchor pin 30 lying in the horizontal plane thru the axis. The cable ends in a yoke 15 which rests in a groove 16 at the end of the lever arm 17. When this cable is pulled the lever arm rotates about the guide post 4, and the cam faces 18 and 19, which form an integral part of the lever, push the ends of the shoes 7 apart from each other, bringing the linings 8 into contact with the drum. When the load applied to the cable is released the spring 20 restores the cable to its normal position and the spring 13 brings the shoe ends together again.

This operating lever or cam is not rigidly attached to any part of the braking mechanism but is free to float within the limits imposed by the surrounding members. It is guided however by the post 4 about which the cam surfaces tend to rotate when the cable pulls down the end of the lever arm 17.

The ends of the shoes come to rest upon the cam surfaces and also upon the post 4, which thus supports the cam end of the assembly and prevents the lower shoe from dragging against the drum under the action of gravity and of the jolts due to wheel movement over rough roads.

Each shoe is provided with an adjusting member. As illustrated these adjusting members are located in the struts 11 between the shoes and the anchor; they comprise a screw member 22 having a threaded end 23, and a member 24 having a tapped hole 25 into which the end 23 is screwed. The screw 22 is provided with a notched wheel 26, against which the spring 12 rests. To adjust the brake, a tool, for example a screwdriver, is inserted thru the hole 27 in the backing plate and engaged with a notch in the wheel 26 to turn the screw 23, which changes the separation of the members 22 and 24.

The floating cam applies substantially the same force to both shoes at all times; this causes unequal wear, since one shoe is self-actuating and the other non-self-actuating and their contribution to the total braking effect is unequal. By providing separate adjustments for each shoe this unequal wear may be taken up independently, thereby eliminating the need for readjustment of the location of the guide post 4 when this is used as a rest for the toe ends of the shoes.

Although the invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a brake, the combination of a brake shoe, a fixed support, an anchor attached to said support, an extensible thrust transmitting member abutting against said shoe and against said anchor, and a tension spring having one end connected to said shoe and the other end connected to said anchor to maintain said shoe, said expansible member, and said anchor in predetermined relationship, and an adjusting member for said extensible member, said adjusting member engaging said spring to be locked in adjusted position.

2. In a brake, the combination of a brake shoe, a fixed support, an anchor attached to said support, a strut abutting against said shoe and against said anchor, an expansible thrust transmitting screw forming part of said strut, and a tension spring having one end connected to said shoe and the other end connected to said anchor to maintain said shoe, said strut, and said anchor in predetermined relationship, and an adjusting member for said expansible screw and engaging said spring to be locked in adjusted position.

3. A brake comprising a pair of brake shoes, a fixed support, an anchor attached to said support between one pair of shoe ends, a pair of rigid expansible struts one resting against each of said shoe ends and said anchor, separate adjusting means for adjusting the effective length of said struts, springs attached to said anchor and to said shoe ends to maintain said shoe, said struts, and said anchor in predetermined relationship, each of said springs engaging one of said adjusting means to lock the same in adjusted position, a guide post attached to the fixed support between the other pair of shoe ends, and a cam between said second pair of shoe ends.

4. In a brake, the combination of a rotatable drum, a pair of brake shoes, a fixed support, anchoring means attached to said support and adapted to receive braking thrust from both of said shoes simultaneously, actuator means for simultaneously forcing said shoes into engagement with said drum, means to adjust one of said shoes in relation to said drum, and separate means to adjust independently the other of said shoes in relation to the drum to compensate for the tendency to unequal wear caused by said floating actuator, said shoes being connected to said anchoring means by individual tension springs which engage said adjusting means to lock the same in adjusted position.

5. In a brake, the combination of a rotatable drum, a pair of brake shoes, a fixed support, an anchor attached to said support to receive braking thrust from both of said shoes simultaneously, one of said shoes being connected to said anchor by a tension spring and spaced from said anchor by a rigid extensible strut, a floating actuator for simultaneously forcing said shoes into engagement with said drum, means to adjust one of said shoes in relationship to said drum, separate means to adjust independently the other of said shoes in relation to the drum, and a projection on one of said adjusting means engaging said spring to lock said adjusting means in adjusted position.

6. In a brake, the combination of a rotatable drum, a pair of brake shoes, a fixed support, an anchor attached to said support to receive braking thrust from both of said shoes simultaneously, a floating actuator for simultaneously forcing said shoes into engagement with said drum, means to adjust one of said shoes in relation to said drum, separate means to adjust independently the other of said shoes in relation to said drum and a spring connecting the end of each shoe to the anchor, said springs being substantially circumferentially mounted with respect to the drum and engaging said adjusting means to lock the same in adjusted position.

HUMPHREY F. PARKER.